(12) United States Patent
Yang

(10) Patent No.: US 11,016,622 B2
(45) Date of Patent: May 25, 2021

(54) DISPLAY DEVICE

(71) Applicant: SAMSUNG DISPLAY CO., LTD., Yongin-si (KR)

(72) Inventor: Hyo-Sang Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/791,002

(22) Filed: Feb. 14, 2020

(65) Prior Publication Data

US 2020/0310594 A1    Oct. 1, 2020

(30) Foreign Application Priority Data

Mar. 26, 2019   (KR) ........................ 10-2019-0034630

(51) Int. Cl.
*G06F 3/044* (2006.01)
(52) U.S. Cl.
CPC .......... *G06F 3/0444* (2019.05); *G06F 3/0443* (2019.05); *G06F 2203/04102* (2013.01)
(58) Field of Classification Search
CPC ......... G06F 3/0443; G06F 2203/04102; G06F 3/0444
See application file for complete search history.

(56) References Cited

U.S. PATENT DOCUMENTS

| | | | |
|---|---|---|---|
| 7,299,547 B2 | 11/2007 | Choi et al. | |
| 2008/0158466 A1* | 7/2008 | Lee ......... | H05K 3/323 349/54 |
| 2019/0074328 A1* | 3/2019 | Park ......... | G06F 3/047 |
| 2019/0115400 A1* | 4/2019 | Park ......... | H01L 51/5206 |
| 2019/0137808 A1* | 5/2019 | Koide ......... | G02F 1/13452 |
| 2019/0326274 A1* | 10/2019 | Lee ......... | H01L 24/16 |
| 2020/0210041 A1* | 7/2020 | Liu ......... | G06F 3/04164 |

FOREIGN PATENT DOCUMENTS

| | | |
|---|---|---|
| KR | 10-2014-0069571 | 6/2014 |
| KR | 10-2017-0065718 | 6/2017 |
| KR | 10-2018-0035270 | 4/2018 |
| KR | 10-1854283 | 4/2018 |

* cited by examiner

*Primary Examiner* — Muhammad N Edun
(74) *Attorney, Agent, or Firm* — F. Chau & Associates, LLC

(57) ABSTRACT

A display device includes: a first touch electrode; a first touch pad electrically connected to the first touch electrode by a touch wire; and a first dummy pad not connected to the touch wire, and disposed adjacent to the first touch pad, wherein a width of the first touch pad is greater than a width of the first dummy pad.

20 Claims, 8 Drawing Sheets

DISPLAY DEVICE

CROSS-REFERENCE TO RELATED APPLICATION

This application claims priority under 35 U.S.C. § 119 to Korean Patent Application No. 10-2019-0034630 filed in the Korean Intellectual Property Office on Mar. 26, 2019, the disclosure of which is incorporated by reference herein in its entirety.

TECHNICAL FIELD

The present invention relates to a display device.

DISCUSSION OF THE RELATED ART

Recently, display devices such as an organic light emitting device and a liquid crystal display have increased in popularity. Generally, a display device includes a display panel including pixels for displaying images.

Further, the display device may further include a touch sensing function allowing the user to interact with the display device while the display device displays images. When the user touches a screen with a finger or a touch pen, the display device senses changes of a pressure, charges, or light applied to the screen, so the touch sensing function determines touch information such as whether an object or icon is touched on the screen and/or a touch position of the user's touch with respect to the screen. The display device may receive an image signal based on the touch information.

Regarding the display device, a pad portion for inputting and outputting signals for controlling pixels and a driving device may be provided. In addition, the display device may generate touch detection signals upon user touches, and a flexible printed circuit board (FPCB) in a form of an integrated circuit (IC) chip or a film may be bonded to the pad portion.

SUMMARY

According to an exemplary embodiment of the present invention, a display device includes: a first touch electrode; a first touch pad electrically connected to the first touch electrode by a touch wire; and a first dummy pad not connected to the touch wire, and disposed adjacent to the first touch pad, wherein a width of the first touch pad is greater than a width of the first dummy pad.

In an exemplary embodiment of the present invention, the display device further includes: a first region and a second region adjacent to the first region, wherein the first touch pad is one of a plurality of first touch pads disposed in the first region; a plurality of second touch pads disposed in the second region; and a plurality of second dummy pads disposed in the second region, wherein the first dummy pad is one of a plurality of first dummy pads disposed in the first region, wherein the plurality of first touch pads and the plurality of first dummy pads are arranged along a first direction in the first region, and wherein the plurality of second touch pads and the plurality of second dummy pads are arranged along the first direction in the second region.

In an exemplary embodiment of the present invention, the plurality of first touch pads and the plurality of first dummy pads are alternately disposed in the first direction.

In an exemplary embodiment of the present invention, each of lower edges of the plurality of first touch pads in the first region faces at least one of upper edges of the plurality of second dummy pads in the second region with respect to a second direction crossing the first direction.

In an exemplary embodiment of the present invention, the display device further includes a second touch electrode, wherein the first touch electrode includes first touch cells arranged in the first direction and first connectors connecting the first touch cells to each other, and wherein the second touch electrode includes second touch cells arranged in the second direction and second connectors connecting the second touch cells to each other.

In an exemplary embodiment of the present invention, the first touch electrode includes fine electrode lines traversing each other and an opening between the fine electrode lines.

In an exemplary embodiment of the present invention, the display device further includes a flexible printed circuit substrate electrically connected to the first touch pad.

According to an exemplary embodiment of the present invention, a display device includes: a substrate including a display area and a non-display area; a pixel circuit disposed in the display area; an organic light emitting element and a partition wall disposed on the pixel circuit; an encapsulation layer covering the pixel circuit, the organic light emitting element, and the partition wall; a first touch electrode disposed on the encapsulation layer; a first touch pad portion disposed in the non-display area; and a touch wire electrically connecting the first touch electrode and the first touch pad portion to each other, wherein the first touch pad portion includes a first touch pad connected to the touch wire and a first dummy pad disposed adjacent to the first touch pad and not connected to the touch wire, and wherein a width of the first touch pad is greater than a width of the first dummy pad.

In an exemplary embodiment of the present invention, the first touch pad is one of a plurality of first touch pads, wherein the first dummy pad is one of a plurality of first dummy pads, and wherein each of the plurality of first dummy pads is disposed between adjacent first touch pads among the plurality of the first touch pads.

In an exemplary embodiment of the present invention, the display device further includes a second touch pad portion, wherein the first touch pad portion is disposed adjacent to a first edge of the substrate, and wherein the second touch pad portion is disposed adjacent to a second edge of the substrate.

In an exemplary embodiment of the present invention, the display device further includes a plurality of second touch pads, wherein each of the first touch pad portion and the second touch pad portion includes both of a first region and a second region which are separated from each other, wherein the plurality of first touch pads are arranged along a first direction in the first region, and wherein the plurality of second touch pads are arranged along the first direction in the second region.

In an exemplary embodiment of the present invention, the display device further includes a plurality of second dummy pads in the second region, and wherein each of lower edges of the plurality of first touch pads in the first region faces at least one of upper edges of the plurality of second dummy pads in the second region with respect to a second direction crossing the first direction.

In an exemplary embodiment of the present invention, the plurality of first touch pads, the plurality of second touch pads, the plurality of first dummy pads, and the plurality of second dummy pads in the first touch pad portion each have a shape that is slanted toward the second edge of the substrate, and the plurality of first touch pads, the plurality of second touch pads, the plurality of first dummy pads, and the plurality of second dummy pads in the second touch pad portion each have a shape that is slanted toward the first edge of the substrate.

In an exemplary embodiment of the present invention, the display device further includes a second touch electrode, wherein the first touch electrode includes first touch cells arranged in the first direction and first connectors connecting the first touch cells to each other, and wherein the second touch electrode includes second touch cells arranged in the second direction and second connectors connecting the second touch cells to each other.

In an exemplary embodiment of the present invention, the display device further includes: an inorganic layer disposed on the encapsulation layer; and a planarization layer disposed on the inorganic layer, wherein the first connectors are disposed on the inorganic layer, wherein the first touch cells, the second touch cells, and the second connectors are disposed on the planarization layer, and wherein the planarization layer includes an opening, wherein the first connectors and the first touch cells are connected via the opening.

In an exemplary embodiment of the present invention, the first touch electrode includes fine electrode lines.

In an exemplary embodiment of the present invention, the first touch electrode includes an opening between the fine electrode lines traversing each other.

In an exemplary embodiment of the present invention, the fine electrode lines overlap the partition wall.

In an exemplary embodiment of the present invention, the display device further includes a conductive layer disposed on the encapsulation layer in the non-display area and connecting the touch wire and the first touch electrode to each other.

In an exemplary embodiment of the present invention, the display device further includes a flexible printed circuit substrate electrically connected to the first and second touch pad portions.

DETAILED DESCRIPTION OF THE EMBODIMENTS

Figure 1:
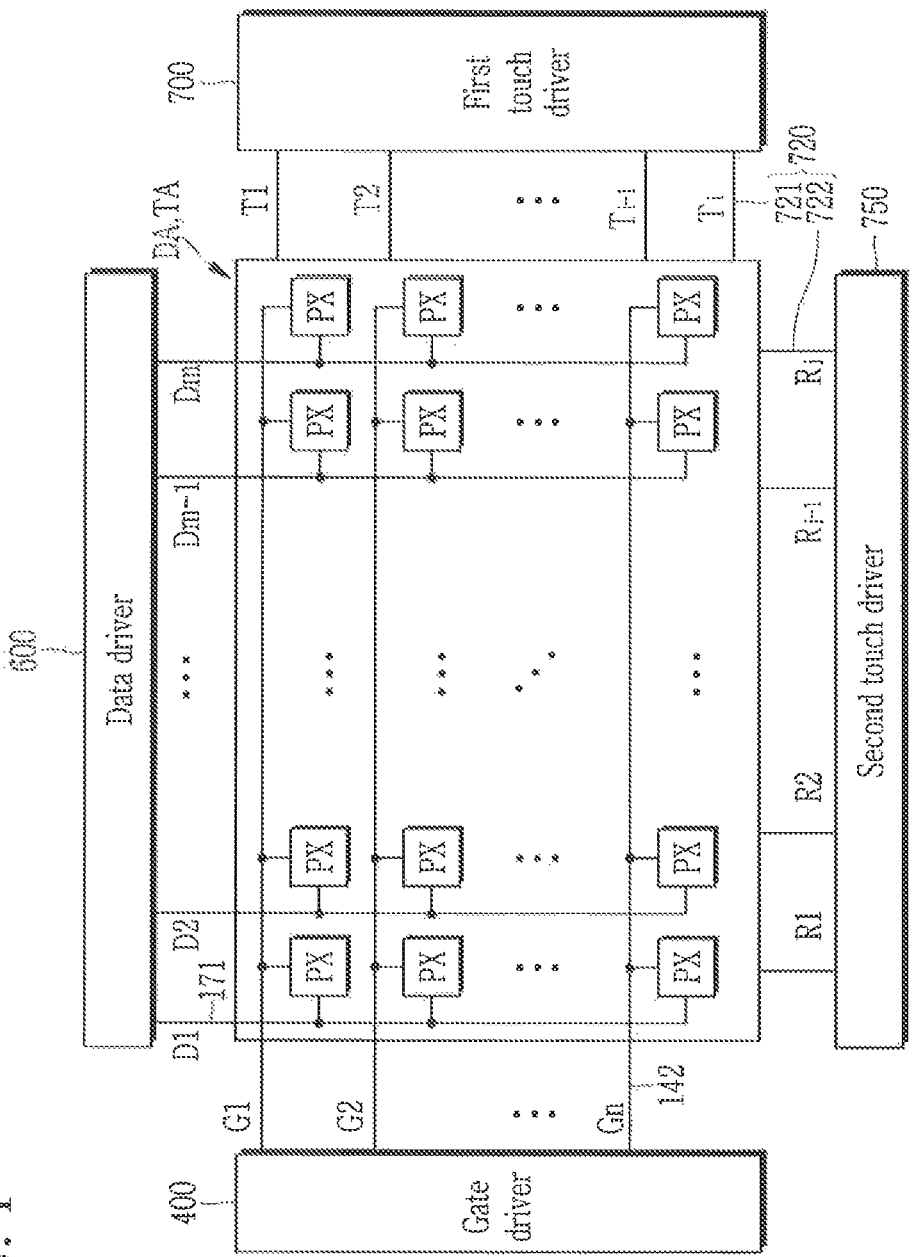
FIG. 1 shows a block diagram of a display device according to an exemplary embodiment of the present invention.

Exemplary embodiments of the present invention will be described more fully hereinafter with reference to the accompanying drawings. As those skilled in the art would realize, the described exemplary embodiments may be modified in various different ways, and thus should not be limited to the exemplary embodiments set forth herein.

In the figures, like reference numerals may denote like elements or features, and thus their descriptions may be omitted.

The size and thickness of each configuration and/or element shown in the drawings may be exaggerated for clarity, and the present invention is not limited thereto.

It will be understood that when an element such as a layer, film, region, or substrate is referred to as being "on" another element, it can be directly on the other element or intervening elements may also be present. In addition, when an element is referred to as being "directly on" another element, there are no intervening elements present.

Further, throughout the specification, the phrase "on a plane" may mean viewing the object portion from the top, and the phrase "on a cross-section" may mean viewing a cross-section of which the object portion is vertically cut from the side.

A display device according to an exemplary embodiment of the present invention will now be described with reference to FIG. 1 and FIG. 2. FIG. 1 shows a block diagram of a display device according to an exemplary embodiment of the present invention.

Referring to FIG. 1, the display device includes a display area (DA), a gate driver 400, a data driver 600, and touch drivers 700 and 750.

The display area (DA) includes a plurality of pixels PX. The pixel PX in the display area (DA) is for displaying an image, and the display area (DA) of the display device displays the image through a plurality of pixels PX.

The gate driver 400 generates scan signals (G1 to Gn) corresponding to an externally supplied driving power and control signals, and the gate driver 400 supplies them to a respective gate line 142. The pixels PX are selected by scan signals (G1 to Gn) and sequentially receive data voltages (D1 to Dm). The gate driver 400 may be provided in a form of a thin film transistor (or a plurality of thin film transistors) on the substrate together with a pixel circuit, or the gate driver 400 may be mounted in a chip formed on the substrate.

The data driver 600 generates data voltages (D1 to Dm) corresponding to externally supplied data and control signals, and supplies them to a respective data line 171. The data voltages (D1 to Dm) supplied to the respective data lines 171 are supplied to the pixel PX selected by the scan signals (G1 to Gn) each time the scan signals (G1 to Gn) are supplied. According to an exemplary embodiment of the present invention, the display device may further include an emission control driver for supplying an emission control signal.

The display device further includes a touch area TA for sensing a touch. It is shown in FIG. 1 that the touch area TA is the same area as the display area (DA). However, the present invention is not limited thereto. For example, the touch area TA may digress from the display area (DA) or may be provided in an area that is wider or narrower than the display area (DA).

The touch drivers 700 and 750 may transmit a touch signal through a touch wire 720 and may sense a touch position. The touch drivers 700 and 750 may include a first touch driver 700 and a second touch driver 750. The first touch driver 700 may transmit touch input signals (T1 to Ti) to a touch electrode through a first touch wire 721, and the second touch driver 750 may receive touch output signals (R1 to Rj) through a second touch wire 722.

Figure 2:
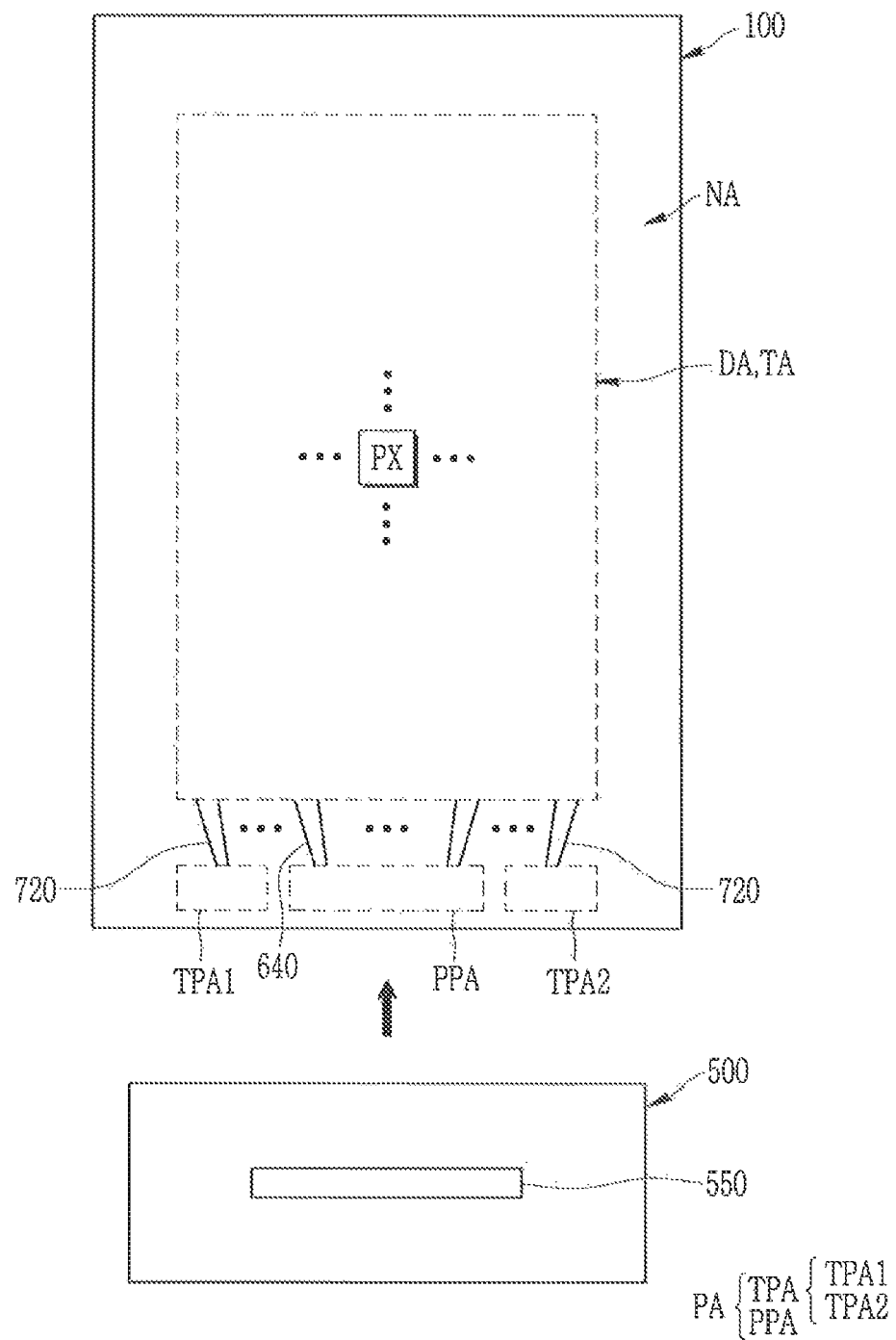
FIG. 2 shows a top plan view of a display device according to an exemplary embodiment of the present invention.

FIG. 2 shows a top plan view of a display device according to an exemplary embodiment of the present invention. The display device includes a display panel 100 and a flexible printed circuit substrate 500.

The display panel 100 includes a plurality of pixels PX and includes a display area (DA) for displaying images, a non-display area (NA) that is an area excluding the display area (DA), and a touch area TA for sensing a touch of the user.

A plurality of pixels PX are provided in the display area (DA), and a plurality of signal lines including a plurality of gate lines 142 and a plurality of data lines 171 are provided therein and connected to the plurality of pixels PX.

The non-display area (NA) may be provided to at least partially surround the display area (DA). In the non-display area (NA), elements or wires for generating or transmitting various signals applied to the display area (DA) may be provided, and a gate driver 400 may be integrated therein.

A pad portion (PA) including pads electrically connected to the flexible printed circuit substrate 500 is provided at one side of the non-display area (NA). The pad portion (PA) includes a pixel driving pad portion (PPA) to which signal lines 640 for driving the pixel PX are connected, and a touch pad portion (TPA) connected to the touch wire 720.

The pixel driving pad portion (PPA) may include pads connected to the signal lines 640 for driving the pixels PX. The signal lines 640 for driving the pixels PX may include a data line 171, a clock signal line, a low voltage line for transmitting a low voltage, and a scanning start signal line for transmitting a scanning start signal.

The touch pad portion (TPA) may include a first touch pad portion TPA1 provided on a left side of the pixel driving pad portion (PPA) and a second touch pad portion TPA2 provided on a right side of the pixel driving pad portion (PPA). For example, the pixel driving pad portion PPA may be provided between the first touch pad portion TPA1 and the second touch pad portion TPA2. In other words, the touch pad portion (TPA) has been described to be provided on respective sides of the pixel driving pad portion (PPA). However, the present invention is not limited thereto. For example, the touch pad portion (TPA) may be provided on one side of the pixel driving pad portion (PPA). For example, the touch pad portion (TPA) and the pixel driving pad portion (PPA) may be provided on a same layer in a cross-sectional view.

The flexible printed circuit substrate 500 may be bent, and one side of the flexible printed circuit substrate 500 may overlap the pad portion (PA) of the display panel 100 and may be electrically connected to the pad portion (PA) in the non-display area (NA) of the display panel 100. For example, the flexible printed circuit substrate 500 may be electrically connected to the first touch pad portion TPA1 and the second touch pad portion TPA2. For example, the flexible printed circuit substrate 500 includes a data driver IC 550 for generating a data voltage that may be a gray voltage corresponding to an input image signal. Further, the touch drivers 700 and 750 of FIG. 1 may be included in the data driver IC 550, or may be manufactured to be an additional driving chip and be mounted on the flexible printed circuit substrate 500.

Figure 3:
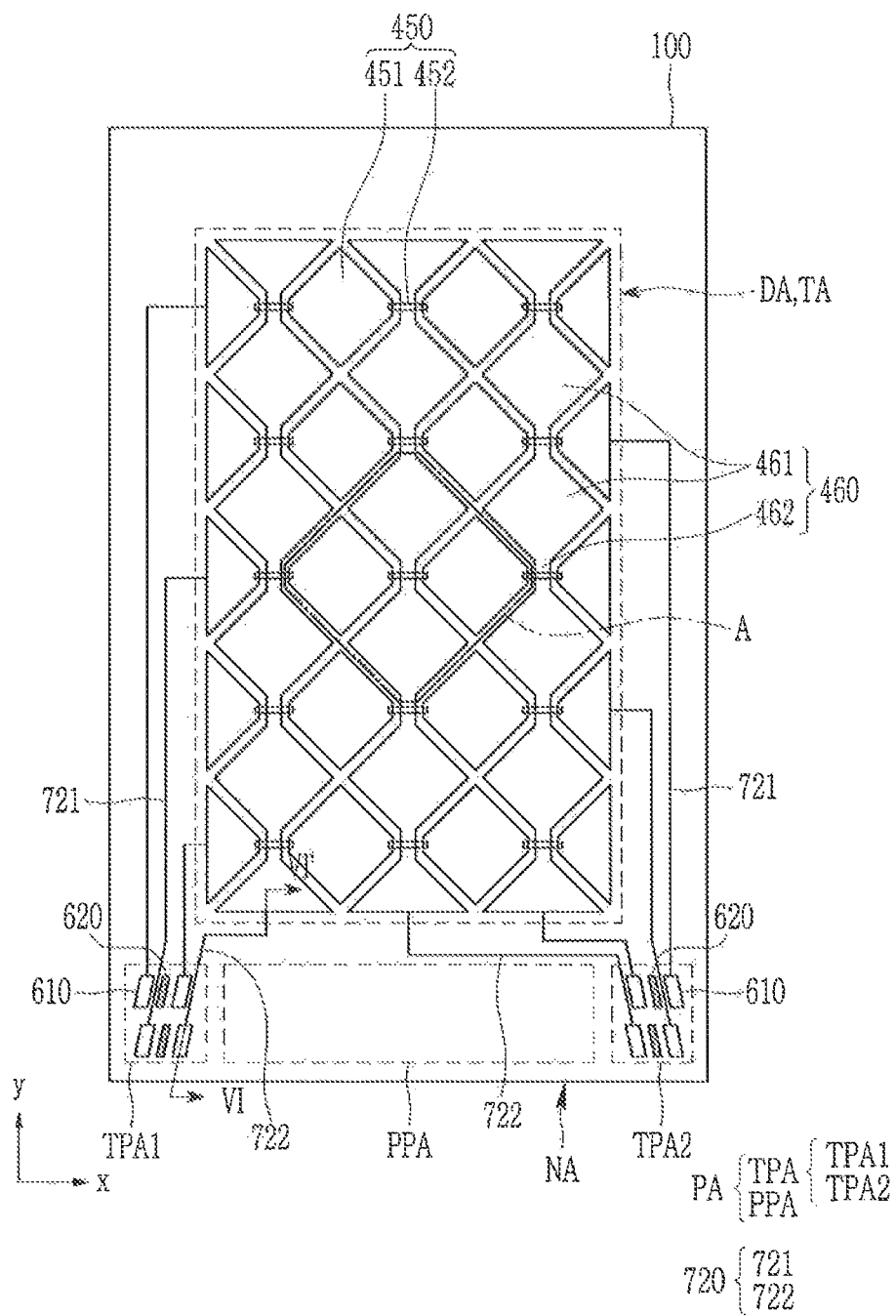
FIG. 3 shows a top plan view of a touch area of a display device of FIG. 1.

FIG. 3 shows a top plan view of a display device of a touch area (TA) of FIG. 1. The touch area TA of the display device includes a first touch electrode 450 and a second touch electrode 460.

The first touch electrode 450 includes a plurality of first touch cells 451 having a polygonal shape (e.g., a rhombus shape), and a plurality of first connectors 452 for connecting the first touch cells 451 to each other in a first direction (x). The first touch electrode 450 may be a transmitter (Tx) touch electrode for transmitting a touch input signal. The first touch cell 451 has been described to have a rhombus shape, but the first touch cell 451 is not limited to the shape.

The second touch electrode 460 may include a plurality of second touch cells 461 having a polygonal shape (e.g., a rhombus shape), and a plurality of second connectors 462 for connecting the second touch cells 461 to each other in a second direction (y). The second touch electrode 460 may be a receiver (Rx) touch electrode for transmitting a touch output signal. The second touch cell 461 has been described to have a rhombus shape, but the second touch cell 461 is not limited to the shape. For example, in a plan view, the first touch cell 451 neighbors the second touch cell 461, and the first connector 452 crosses the second connector 462.

The first touch electrode 450 is separated from the second touch electrode 460 by a predetermined interval, and capacitance may be formed between the first touch electrode 450 and the second touch electrode 460. When a touch is generated by the user, the capacitance formed between the first touch electrode 450 and the second touch electrode 460 changes, and the first touch driver 700 and the second touch driver 750 of FIG. 1 may recognize this change of capacitance to determine the touch position.

The first touch cell 451, the second touch cell 461, and the second connector 462 may be provided on the same layer. The first connector 452 may be provided on a different layer from the first touch cell 451, the second touch cell 461, and the second connector 462. For example, the first connector 452 may be provided below the first touch cell 451, the second touch cell 461, and the second connector 462. However, the present invention is not limited thereto. For example, the first connector 452 may be disposed above the first touch cell 451, the second touch cell 461, and the second connector 462. To be described, the first connector 452 may be connected to the first touch cell 451 through an opening.

The second touch cell 461 and the second connector 462 of the second touch electrode 460 may be integrally formed. For example, the first touch cell 451, the second touch cell 461, and the second connector 462 may be simultaneously formed in the same processing stage. However, the second connector 462 may not be simultaneously formed with the first touch cell 451 and the second touch cell 461, and it may be formed separately by using a different material in another processing stage.

Further, it has been described in the present exemplary embodiment that the first connector 452 is disposed on the different layer from the first touch cell 451, the second touch cell 461, and the second connector 462, but the present invention is not limited thereto. For example, the first touch cell 451, the second touch cell 461, and the first connector 452 may be disposed on the same layer, and the second connector 462 may be disposed on the different layer from the first touch cell 451, the second touch cell 461, and the first connector 452.

In an exemplary embodiment of the present invention, the first touch cell 451 and the first connector 452 of the first touch electrode 450 may be disposed on the same layer, the second touch cell 461 and the second connector 462 of the second touch electrode 460 may be disposed on the same layer, and the first touch electrode 450 and the second touch electrode 460 may be disposed on different layers from each other.

The first touch electrode 450 and the second touch electrode 460 may include a low resistance metal such as silver (Ag), aluminum (Al), copper (Cu), chromium (Cr), or nickel (Ni), or a conductive nanomaterial such as a silver nanowire or carbon nanotubes. The touch electrode (e.g., 450 and/or 460) has low resistance so an RC delay may be reduced, and it has flexibility so it may not be easily cracked when it is repeatedly deformed such as bent.

A touch wire 720 is disposed in the non-display area (NA) of the display panel 100. The touch wire 720 includes a first touch wire 721 and a second touch wire 722. The first touch wire 721 is connected to the first touch electrode 450, and a second touch wire 722 connected to the second touch electrode 460. The touch wire 720 may extend in the non-display area (NA), and may be connected to the touch pad 610 of the touch pad portion (TPA).

The touch pad portion (TPA) includes a touch pad 610 and a dummy pad 620. The touch pad 610 is connected to the touch wire 720, and the dummy pad 620 not connected to the touch wire 720 and floating. The dummy pad 620 may be disposed among the touch pads 610. In addition, the touch pad 610 and the dummy pad 620 may be alternately disposed in the first direction (x). For clarity, sizes of the touch electrodes 450 and 460 and the touch pad 610 may be exaggerated, and the display device may include a different number of touch electrodes 450 and 460 and touch pads 610.

Figure 4:
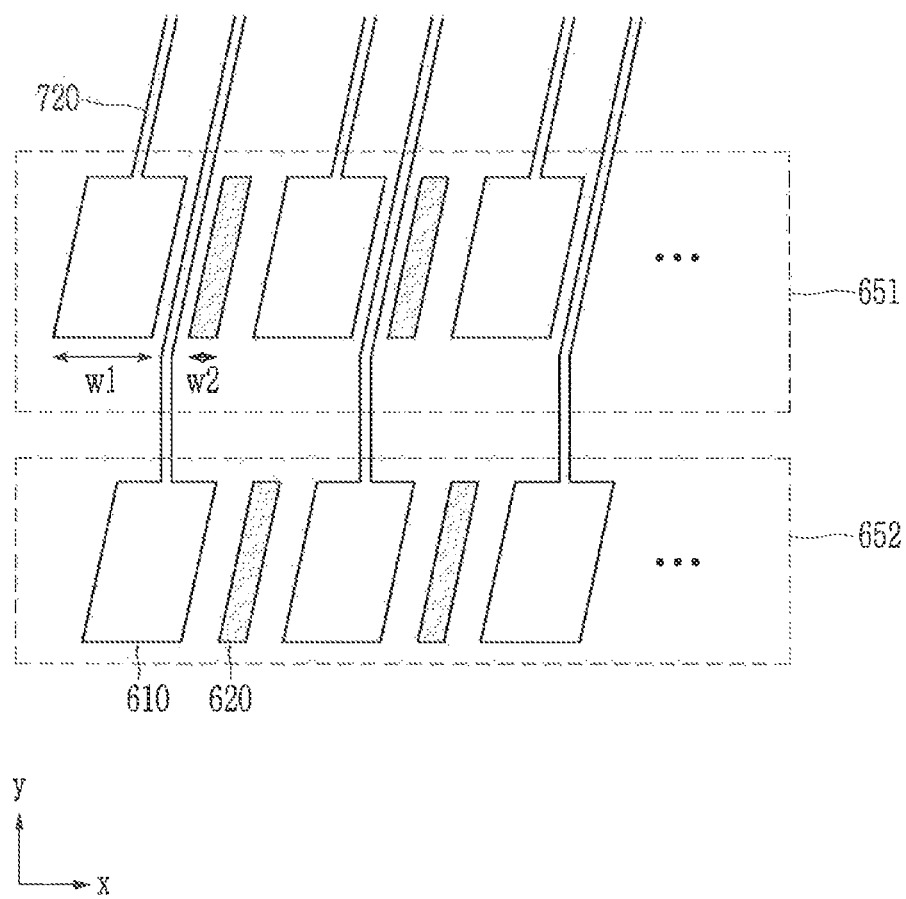
FIG. 4 shows a layout view of an enlarged first touch pad portion of FIG. 3.

FIG. 4 shows a layout view of an enlarged first touch pad portion (TPA1) of FIG. 3. The first touch pad portion (TPA1) includes a touch pad 610 and a dummy pad 620.

The touch pad 610 is electrically connected to the first touch electrode 450 or the second touch electrode 460 by the touch wire 720. The touch pad 610 may have a quadrangular shape. For example, the touch pad 610 may have a rhombus shape, a square shape, or a rectangular shape. As an additional example, the touch pad 610 may have a quadrangular shape that includes an upper portion that is inclined or slanted to a right side of, for example, the display panel 100. In other words, a lateral side of the touch pad 610 may form an oblique line extending toward an upper right side of the touch pad 610. When the touch pad 610 is formed to have an inclined quadrangular shape (e.g., a rhombus shape) rather than a rectangular shape, it is easier to align the touch pad 610 than the touch pad formed to have a rectangular shape.

The touch pad 610 may be disposed in two rows. In other words, the first touch pad portion (TPA1) may include a first region 651 and a second region 652 disposed below the first region 651 in a plan view. The first region 651 and the second region 652 may respectively extend in the first direction (x). The first region 651 may be separated from the second region 652 in the second direction (y). The touch pad 610 is sequentially disposed in the first direction (x) in the first region 651 and the second region 652.

The touch pad 610 disposed in the first region 651 and the touch pad 610 disposed in the second region 652 may receive different signals from each other. Therefore, the display device according to an exemplary embodiment of the present invention may reduce the number of touch pads 610 compared to the case in which the touch pad 610 disposed in the first region 651 and the touch pad 610 disposed in the second region 652 receive the same signal as each other. As a result, a compressed area of the touch pad 610 may be obtained, and the size of the touch pad 610 may be further increased. Further, the number of touch wires 720 may be minimized, so it is possible to increase the thickness of the touch wires 720.

The dummy pad 620 is disposed between the touch pads 610. The touch pad 610 and the dummy pad 620 may be alternately disposed with respect to the first direction (x). The dummy pad 620 may be in floating state while not connected to the first touch electrode 450 and the second touch electrode 460. In other words, the dummy pad 620 may not receive any voltage. Regarding the display device according to an exemplary embodiment of the present invention, the dummy pad 620 may be disposed between the touch pads 610 to prevent signal interference or noise that may be generated between the adjacent touch pads 610.

In the first touch pad portion TPA1 and the second touch pad portion TPA2, at least one dummy pad 620 may be disposed in a region separated from the touch pad 610 in the second direction (y). For example, a lower edge of the touch pad 610 disposed in the first region 651 may face at least one upper edge of the dummy pads 620 disposed in the second region 652 with respect to the second direction (y). Further, an upper edge of the touch pad 610 disposed in the second region 652 may face at least one lower edge of the dummy pads 620 disposed in the first region 651 with respect to the second direction (y). Therefore, noise that may be generated between the adjacent touch pads 610 in the first direction (x) and noise that may be generated between the adjacent touch pads 610 in the second direction (y) may be prevented.

A width w1 of the touch pad 610 may be greater than a width w2 of the dummy pad 620. In this instance, the width represents a length in the first direction (x). As the number of the touch pads 610 is minimized, it is possible to increase the width w1 of the touch pad 610 in a same space. Therefore, an access defect that may be generated in the touch pad 610 may be prevented.

The touch wire 720 connected to the touch pad 610 disposed in the second region 652 may extend to pass between the touch pad 610 and the dummy pad 620 disposed in the first region 651.

Figure 5:
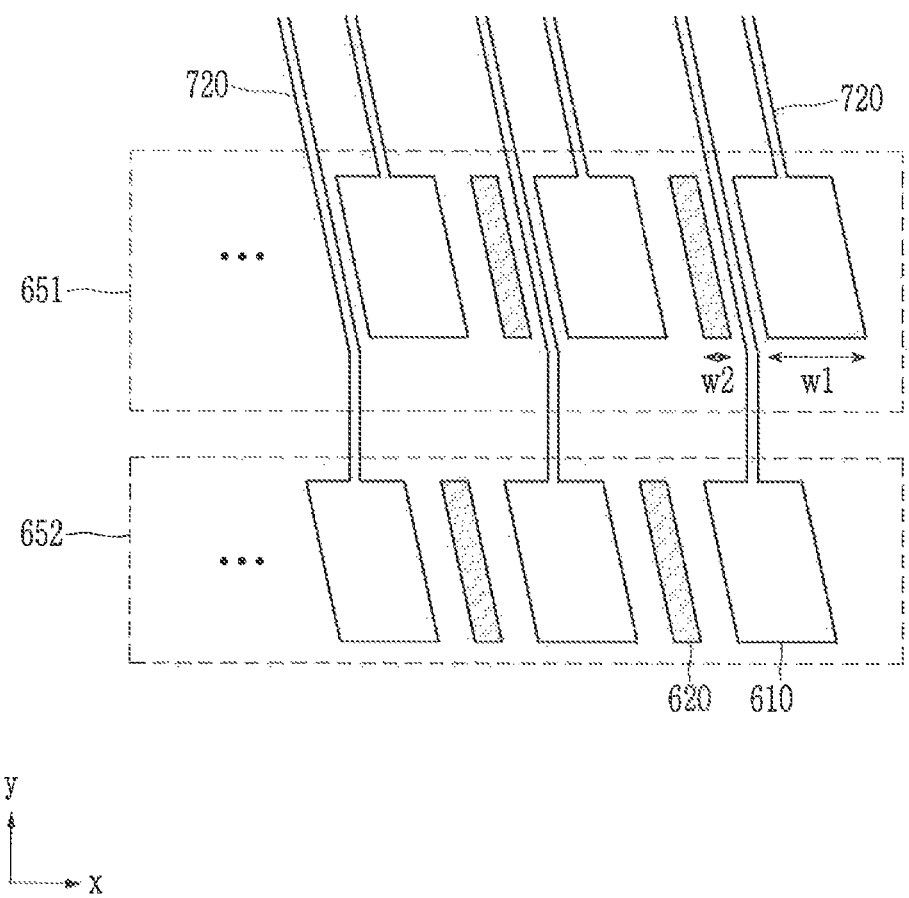
FIG. 5 shows a layout view of an enlarged second touch pad portion of FIG. 3.

FIG. 5 shows a layout view of an enlarged second touch pad portion (TPA2) of FIG. 3. The second touch pad portion TPA2 includes a touch pad 610 and a dummy pad 620. The second touch pad portion TPA2 is similar to that shown with reference to FIG. 4 except for the shape of the touch pad 610, so no repeated or redundant content will be described.

The touch pad 610 of the second touch pad portion TPA2 may have a quadrangular shape. For example, the touch pad 610 may have a rhombus shape, a square shape, or a rectangular shape. As an additional example, the touch pad 610 may have a quadrangular shape that includes an upper portion that is inclined or slanted to a left side of, for example, the display panel 100. In other words, a lateral side of the touch pad 610 may form an oblique line extending toward an upper left side of the touch pad 610. When the touch pad 610 is formed to have an inclined quadrangular shape (e.g., a rhombus shape), it is easier to align the touch pad 610 compared to the touch pad formed to have a rectangular shape.

The second touch pad portion TPA2 may include a first region 651 and a second region 652 disposed below the first region 651. The first region 651 may be separated from the second region 652 in the second direction. A touch pad 610 is sequentially disposed in the first direction (x) in the first region 651 and the second region 652.

The touch pad 610 disposed in the first region 651 and the touch pad 610 disposed in the second region 652 may receive different signals.

The dummy pad 620 is disposed between the touch pads 610, and it floats while not connected to the first touch electrode 450 and the second touch electrode 460. In other words, the dummy pad 620 may not receive any voltages.

At least one dummy pad 620 may be disposed in a region separated from the touch pad 610 in the second direction (y). For example, the lower edge of the touch pad 610 disposed in the first region 651 may face at least one upper edge of the dummy pads 620 disposed in the second region 652 with respect to the second direction (y). Further, the upper edge of the touch pad 610 disposed in the second region 652 may face at least one lower edge of the dummy pads 620 disposed in the first region 651 with respect to the second direction (y).

The width w1 of the touch pad 610 may be greater than the width w2 of the dummy pad 620. As the number of the touch pads 610 is minimized, it is possible to increase the width w1 of the touch pad 610 in the same space.

Figure 6:
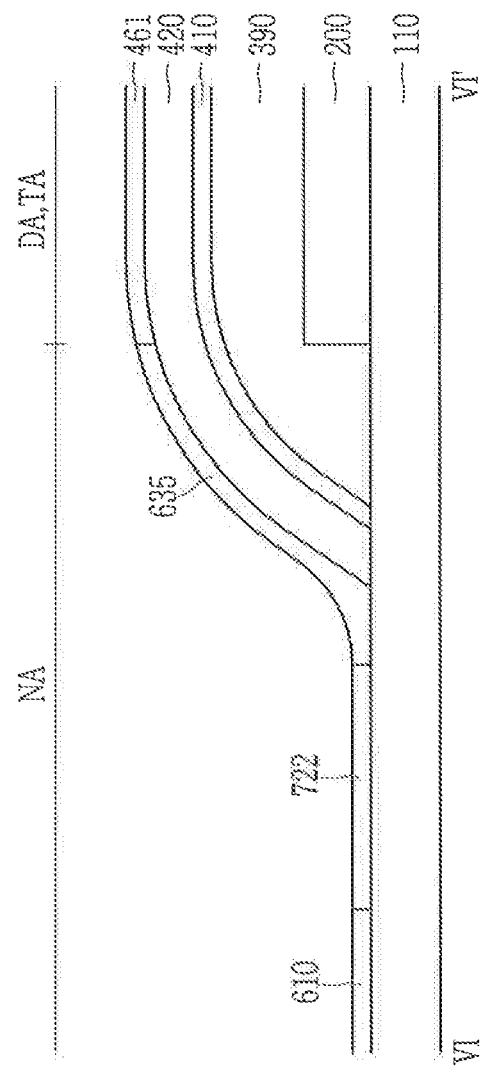
FIG. 6 shows a cross-sectional view of a display device with respect to a line VI-VI' of FIG. 3.

FIG. 6 shows a cross-sectional view of a display device with respect to a line VI-VI' of FIG. 3.

Referring to FIG. 6, the display panel 100 includes a substrate 110. The substrate 110 may include a flexible material such as plastic, that may be bent, folded, or wrapped. The substrate 110 may also include the above-described display area (DA) and the non-display area (NA).

A display layer 200 is disposed in the display area (DA) of the substrate 110. The display layer 200 includes a pixel circuit including at least one thin film transistor, an organic light emitting element of which emission of light is controlled by the pixel circuit, and a partition wall for partitioning an emission region.

An encapsulation layer 390 for covering the display layer 200 is disposed on the display layer 200. For example, the encapsulation layer 390 may seal the display layer 200 by covering the upper side and the lateral sides of the display layer 200. The encapsulation layer 390 may be disposed on a front side of the display area (DA) and may be extended from the display area (DA), and an end of the encapsulation layer 390 may be disposed in the non-display area (NA).

When the display device is an organic light emitting device, the organic light emitting element is very weak or sensitive to moisture and oxygen such that the display device may be damaged, so the encapsulation layer 390 seals the display layer 200 to intercept or prevent inflowing of external moisture and oxygen. The encapsulation layer 390 may include a plurality of layers, and it may be formed of a multilayer structure including an inorganic film and an organic film. For example, it may be formed of a triple layer on which an inorganic film, an organic film, and an inorganic film are sequentially formed.

An inorganic layer 410 may be included on the encapsulation layer 390. The inorganic layer 410 may include at least one of a metal oxide, a metal oxynitride, a silicon oxide, a silicon nitride, or a silicon oxynitride.

A planarization layer 420 is disposed on the inorganic layer 410. The planarization layer 420 may include an organic material such as an acryl-based resin.

A second touch cell 461 is disposed on the planarization layer 420. The second touch cell 461 is electrically connected to the touch pad 610 through a connecting member (e.g., a conductive layer) 635 and the second touch wire 722. For example, the connecting member 635 may be disposed on the encapsulation layer 390 in the non-display area (NA). In addition, the connecting member 635 may extend to the edge of the encapsulation layer 390, and it may be electrically connected to the second touch wire 722 disposed on the substrate 110. As an additional example, the connecting member 635 may be disposed on the encapsulation layer 390 and partially disposed on the substrate 110. The connecting member 635 may include a conductive curing material.

In an exemplary embodiment of the present invention, the first touch cell 451 may be electrically connected to the touch pad 610 through a connecting member, disposed on the encapsulation layer 390, and the first touch wire 721.

Figure 7:
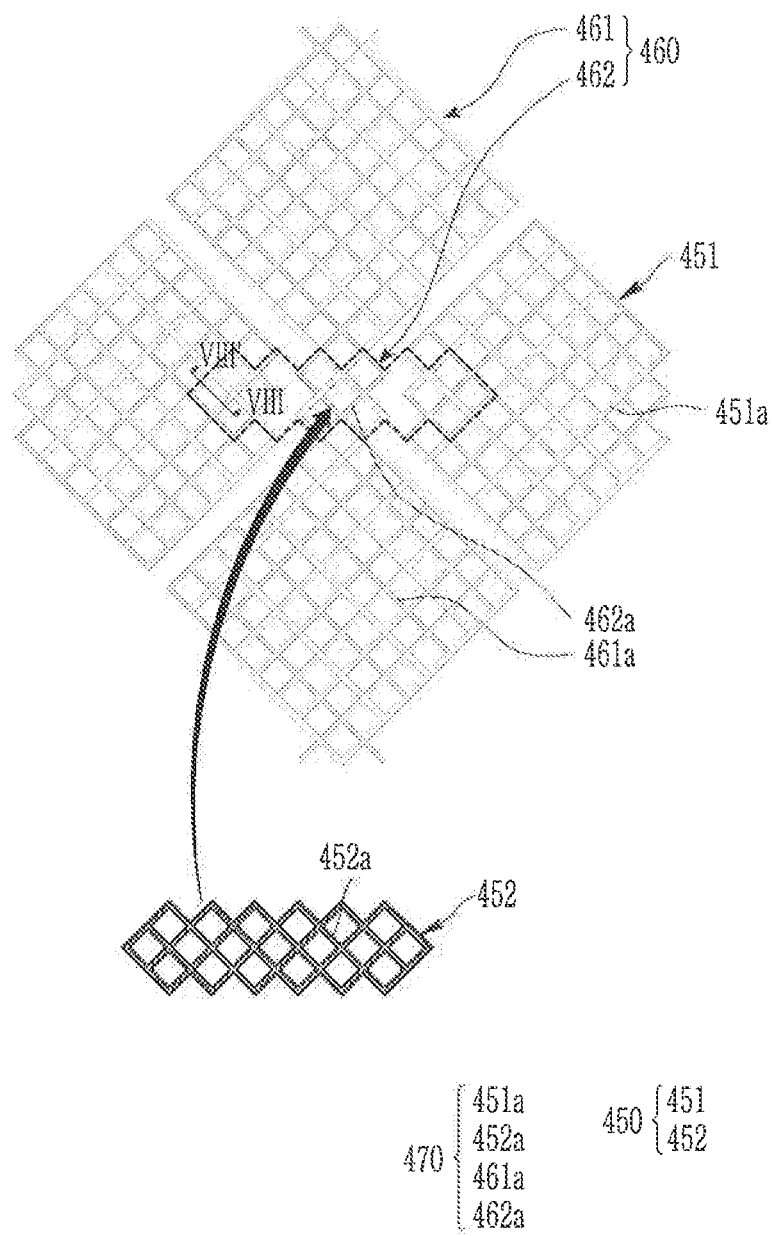
FIG. 7 shows a layout view of an enlarged portion A of FIG. 3.

FIG. 7 shows a layout view of an enlarged portion A of FIG. 3. It is shown in FIG. 7 that the first touch cell 451 of the first touch electrode 450 and the second touch cell 461 of the second touch electrode 460 are separated from the first connector 452 disposed on a different layer.

Referring to FIG. 7, the first touch electrode 450 and the second touch electrode 460 may be formed in a mesh pattern. In this case, the first touch electrode 450 and the second touch electrode 460 include a plurality of fine electrode lines 470 which have a fine width and are arranged in parallel to a third direction and a fourth direction traversing the third direction (e.g., the fourth direction is substantially perpendicular to the third direction). The fine electrode lines 470 include a fine electrode line 451a of the first touch cell 451 and a fine electrode line 452a of the first connector 452. The fine electrode lines 470 further include a fine electrode line 461a of the second touch cell 461 and a fine electrode line 462a of the second connector 462. The fine electrode line 470 arranged in the third direction and the fine electrode line 470 arranged in the fourth direction crossing each other to thus form an opening with a rhombus shape. For example, the mesh pattern of the first touch electrode 450 and the second touch electrode 460 may have a constant lattice shape according to an arrangement of the fine electrode lines 470.

The first touch electrode 450 and the second touch electrode 460 are formed of a plurality of fine electrode lines 470, and they may not intercept light emitted by the organic light emitting device and may reduce an area of overlapping wires of the display panel 100 to thus minimize parasitic capacitance.

The first touch electrode 450 and the second touch electrode 460 have been described to include an opening in a rhombus shape, but the shape of the opening is not limited thereto, and it may have various shapes such as a quadrangular shape or a polygonal shape. Further, the third direction and the fourth direction in which the fine electrode lines 470 extend are not limited to the oblique direction, and they may be parallel to the first direction or the second direction.

The first connector 452 may be disposed below the first touch cell 451, the second touch cell 461, and the second connector 462. The first connector 452 is disposed on a portion shown with a dotted line in FIG. 7, and partly overlaps the first touch cell 451 and the second connector 462. The first connector 452 is connected to the first touch cell 451 in a region overlapping the first touch cell 451.

Figure 8:
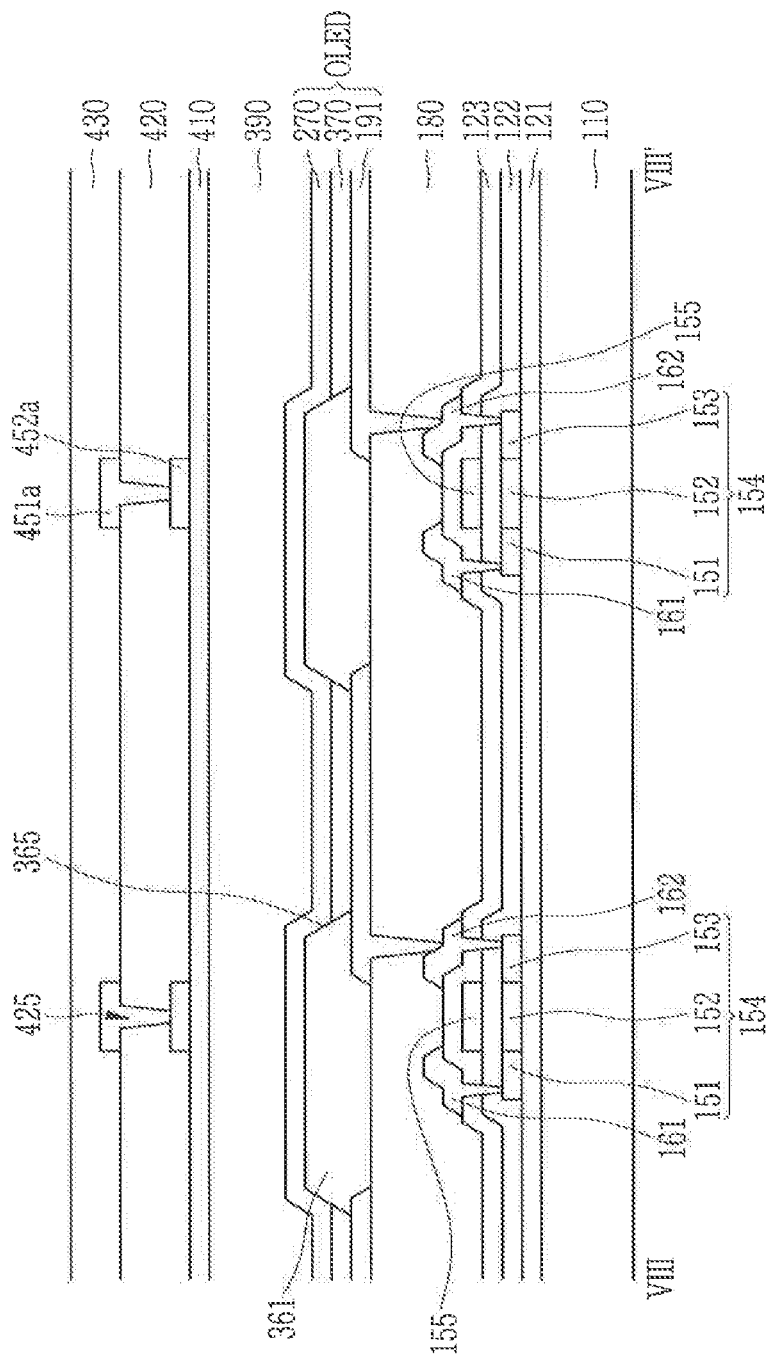
FIG. 8 shows a cross-sectional view of a display device with respect to a line VIII-VIII' of FIG. 7.

FIG. 8 shows a cross-sectional view of a display device with respect to a line VIII-VIII' of FIG. 7.

The display device includes a substrate 110, and a buffer layer 121 is disposed on the substrate 110. For example, the buffer layer 121 may include a silicon nitride ($SiN_x$) or a silicon oxide ($SiO_x$). The buffer layer 121 is disposed between the substrate 110 and a semiconductor layer 154. The buffer layer 121 may prevent a penetration of an impurity from the substrate 110 in a crystallization process for forming polysilicon, and the buffer layer 121 may flatten the substrate 110, to thereby release stress of the semiconductor layer 154 formed on the buffer layer 121.

The semiconductor layer 154 is disposed on the buffer layer 121. The semiconductor layer 154 may be made of a polysilicon or an oxide semiconductor. The semiconductor layer 154 includes a channel region 152, a source region 151, and a drain region 153. The source region 151 and the drain region 153 are disposed on respective sides of the channel region 152. The channel region 152 is an intrinsic semiconductor to which an impurity is not doped, and the source region 151 and the drain region 153 are impurity semiconductors to which a conductive impurity is doped. The semiconductor layer 154 may be made of an oxide semiconductor, and in this case, an additional passivation layer may be provided to protect an oxide semiconductor material that is weak in external environments such as a high temperature.

A gate insulating layer 122 is disposed on the semiconductor layer 154 to cover the same. The gate insulating layer 122 may be a single layer or a multilayer structure including at least one of a silicon nitride ($SiN_x$) or a silicon oxide ($SiO_x$).

A gate electrode 155 is disposed on the gate insulating layer 122, and the gate electrode 155 may be a multilayer structure on which a metal film including one of copper (Cu), a copper alloy, aluminum (Al), an aluminum alloy, molybdenum (Mo), and/or a molybdenum alloy is stacked.

An interlayer insulating layer 123 is disposed on the gate electrode 155 and the gate insulating layer 122. For example, the interlayer insulating layer 123 may include a silicon nitride ($SiN_x$) or a silicon oxide ($SiO_x$). Openings for exposing the source region 151 and the drain region 153, respectively, is disposed in the interlayer insulating layer 123.

A source electrode 161 and a drain electrode 162 are disposed on the interlayer insulating layer 123. The source electrode 161 and the drain electrode 162 are respectively connected to the source region 151 and the drain region 153 of the semiconductor layer 154 through the openings formed in the interlayer insulating layer 123 and the gate insulating layer 122.

A passivation layer 180 is disposed on the interlayer insulating layer 123, the source electrode 161, and the drain electrode 162. The passivation layer 180 covers the interlayer insulating layer 123, the source electrode 161, and the drain electrode 162 to flatten the same, so a pixel electrode 191 may be formed on the passivation layer 180 without steps or an uneven surface. The passivation layer 180 may be made of a stacked film of an organic material such as a polyacrylate resin or a polyimide resin, or of an organic material and an inorganic material.

The pixel electrode 191 is disposed on the passivation layer 180. The pixel electrode 191 is connected to the drain electrode 162 through an opening of the passivation layer 180.

A driving transistor configured with a gate electrode 155, a semiconductor layer 154, a source electrode 161, and a drain electrode 162 is connected to the pixel electrode 191 to supply a driving current to the organic light emitting element (OLED). The display device according to the present exemplary embodiment may further include a switching transistor connected to the data line 171 and transmitting a data voltage in response to a scan signal, and a compensation transistor connected to the driving transistor and compensating a threshold voltage of the driving transistor in response to the scan signal, in addition to the driving transistor described with reference to FIG. 8.

A partition wall 361 for covering the passivation layer 180 and the pixel electrode 191 is disposed on the passivation layer 180 and the pixel electrode 191, and the partition wall 361 includes a pixel opening 365 for exposing the pixel electrode 191. The partition wall 361 may include an organic material such as a polyacrylate resin or a polyimide resin, or a silica-based inorganic material. The pixel opening 365 may have a rhombus shape in a plan view. However, the present invention is not limited thereto. For example, the pixel opening 365 may have various shapes such as a quadrangular shape or a polygonal shape.

An organic emission layer 370 is disposed on the pixel electrode 191 exposed by the pixel opening 365. The organic emission layer 370 may be made of a low molecular organic material, or a high molecular organic material such as a poly(3,4-ethylenedioxythiophene) (PEDOT). Further, the organic emission layer 370 may be a multilayer structure further including one or more of a hole injection layer (HIL), a hole transporting layer (HTL), an electron transporting layer (ETL), and/or an electron injection layer (EIL).

A common electrode 270 is disposed on the organic emission layer 370. The common electrode 270 may be disposed on a plurality of pixels. The pixel electrode 191, the organic emission layer 370, and the common electrode 270 may form an organic light emitting diode (OLED).

Here, the pixel electrode 191 may be an anode that is a hole injection electrode, and the common electrode 270 may be a cathode that is an electron injection electrode. However, an exemplary embodiment of the present invention is not limited thereto, and the pixel electrode 191 may be a cathode and the common electrode 270 may be an anode depending on the method for driving an organic light emitting device. When holes and electrons are injected into the organic emission layer 370 from the pixel electrode 191 and the common electrode 270, and excitons that are combinations of injected holes and electrons transition to a ground state from an excited state, an emission of light is performed during that transition.

An encapsulation layer 390 is disposed on the common electrode 270. A detailed description on the encapsulation layer 390 corresponds to that described with reference to FIG. 6, so it will be omitted here.

An inorganic layer 410 is disposed on the encapsulation layer 390. The inorganic layer 410 may include at least one of a metal oxide, a metal oxynitride, a silicon oxide, a silicon nitride, or a silicon oxynitride. The inorganic layer 410 may cover the encapsulation layer 390 to protect the encapsulation layer 390 and prevent permeation of moisture. Further, the inorganic layer 410 may function to reduce parasitic capacitance between the common electrode 270 and the touch electrode.

A fine electrode line 452a of the first connector 452 is disposed on the inorganic layer 410, and a planarization layer 420 is disposed on the fine electrode line 452a of the first connector 452.

A fine electrode line 451a of the first touch cell 451 is disposed on the planarization layer 420. Further, although not shown here, a second touch cell 461 and a second connector 462 connected to the second touch cell 461 are disposed on the planarization layer 420. The first touch cell 451 is disposed to neighbor the second touch cell 461 in a plan view. The first connector 452 overlaps the second connector 462 in a plan view.

As described with reference to FIG. 7, the first touch cell 451 of the first touch electrode 450 overlaps a region of the first connector 452. In the region where the first touch cell 451 overlaps the first connector 452, the first touch cell 451 is connected to the first connector 452 to contact each other. For example, the planarization layer 420 may include an opening 425 that is a region in which the first connector 452 is exposed, and when the fine electrode line 451a of the first touch cell 451 is formed on the planarization layer 420, a material for forming the fine electrode line 451a of the first touch cell 451 fills the opening 425 to contact the fine electrode line 452a of the first connector 452 and be connected thereto. For example, the first touch cell 451 is disposed on the planarization layer 420, and it may also be disposed in the opening 425 that exposes the first connector 452 and may be connected to the first connector 452.

The fine electrode line 451a of the first touch cell 451 and the fine electrode line 452a of the first connector 452 overlap the partition wall 361, and may be disposed in the region in which the partition wall 361 is disposed. Further, a plurality of fine electrode lines 470 shown in FIG. 7 may have a shape that corresponds to the partition wall 361 in a plan view. Accordingly, the pixel opening 365 may overlap the opening formed by the plurality of fine electrode lines 470. In this instance, the plurality of fine electrode lines 470 may not be disposed in the entire region where the partition wall 361 is disposed, and may overlap the partition wall 361. For example, only one pixel opening 365 may be disposed between adjacent fine electrode lines 470 among the plurality of fine electrode lines 470. However, the present invention is not limited thereto. For example, a plurality of pixel openings 365 may be disposed between adjacent fine electrode lines 470 among the plurality of fine electrode lines 470.

A touch electrode passivation layer 430 may be disposed on the fine electrode line 451a of the first touch cell 451. The touch electrode passivation layer 430 may cover the first touch electrode 450 and the second touch electrode 460 so that they may not be exposed to the outside, thereby protecting the first touch electrode 450 and the second touch electrode 460. The touch electrode passivation layer 430 may include an inorganic material, such as a silicon nitride ($SiN_x$) or a silicon oxide ($SiO_x$), and/or an organic material, such as a polyacrylate resin or a polyimide resin.

It has been described in FIG. 8 that the first connector 452 is disposed below the planarization layer 420, and depending on exemplary embodiments, positions of the first touch cell 451 and the second touch cell 461, and the second connector 462 and the first connector 452, are interchangeable. For example, the first touch cell 451, the second touch cell 461, and the second connector 462 may be formed on the inorganic layer 410 and covered by the planarization layer 420. In this instance, first connector 452 may be located on the planarization layer 420.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
a first touch electrode;
a first touch pad electrically connected to the first touch electrode by a touch wire;
a first dummy pad not connected to the touch wire, and disposed adjacent to the first touch pad;
a first region and a second region adjacent to the first region, wherein the first touch pad is one of a plurality of first touch pads disposed in the first region, and the first dummy pad is one of a plurality of first dummy pads disposed in the first region;
a plurality of second touch pads disposed in the second region; and
a plurality of second dummy pads disposed in the second region,
wherein the plurality of first touch pads and the plurality of first dummy pads are arranged along a first direction in the first region, and
wherein the plurality of second touch pads and the plurality of second dummy pads are arranged along the first direction in the second region.

2. The display device of claim 1, wherein a width of the first touch pad is greater than a width of the first dummy pad.

3. The display device of claim 2, wherein
the plurality of first touch pads and the plurality of first dummy pads are alternately disposed in the first direction.

4. The display device of claim 3, wherein
each of lower edges of the plurality of first touch pads in the first region faces at least one of upper edges of the plurality of second dummy pads in the second region with respect to a second direction crossing the first direction.

5. The display device of claim 4, further comprising a second touch electrode,
wherein the first touch electrode includes first touch cells arranged in the first direction and first connectors connecting the first touch cells to each other, and
wherein the second touch electrode includes second touch cells arranged in the second direction and second connectors connecting the second touch cells to each other.

6. The display device of claim 5, wherein
the first touch electrode includes fine electrode lines traversing each other and an opening between the fine electrode lines.

7. The display device of claim 6, further comprising
a flexible printed circuit substrate electrically connected to the first touch pad.

8. A display device comprising:
a substrate including a display area and a non-display area;
a pixel circuit disposed in the display area;
an organic light emitting element and a partition wall disposed on the pixel circuit;
an encapsulation layer covering the pixel circuit, the organic light emitting element, and the partition wall;
a first touch electrode disposed on the encapsulation layer;
a first touch pad portion disposed in the non-display area;
a plurality of second touch pads; and
a touch wire electrically connecting the first touch electrode and the first touch pad portion to each other,
wherein the first touch pad portion includes a first touch pad connected to the touch wire and a first dummy pad disposed adjacent to the first touch pad and not connected to the touch wire,
wherein the first touch pad is one of a plurality of first touch pads and the first dummy pad is one of a plurality of first dummy pads,
wherein the first touch pad portion includes a first region and a second region which are separated from each other,
wherein the plurality of first touch pads are arranged along a first direction in the first region, and
wherein the plurality of second touch pads are arranged along the first direction in the second region.

9. The display device of claim 8,
wherein a width of the first touch pad is greater than a width of the first dummy pad, and
wherein each of the plurality of first dummy pads is disposed between adjacent first touch pads among the plurality of the first touch pads.

10. The display device of claim 9, further comprising a second touch pad portion, wherein the first touch pad portion is disposed adjacent to a first edge of the substrate, and wherein the second touch pad portion is disposed adjacent to a second edge of the substrate.

11. The display device of claim 10,
wherein the second touch pad portion includes a first region and a second region which are separated from each other,
wherein the plurality of first touch pads are arranged along a first direction in the first region, and
wherein the plurality of second touch pads are arranged along the first direction in the second region.

12. The display device of claim 11, further comprising a plurality of second dummy pads in the second region, and
wherein each of lower edges of the plurality of first touch pads in the first region faces at least one of upper edges of the plurality of second dummy pads in the second region with respect to a second direction crossing the first direction.

13. The display device of claim 12, wherein
the plurality of first touch pads, the plurality of second touch pads, the plurality of first dummy pads, and the plurality of second dummy pads in the first touch pad portion each have a shape that is slanted toward the second edge of the substrate, and
the plurality of first touch pads, the plurality of second touch pads, the plurality of first dummy pads, and the plurality of second dummy pads in the second touch pad portion each have a shape that is slanted toward the first edge of the substrate.

14. The display device of claim 13, further comprising a second touch electrode,
wherein the first touch electrode includes first touch cells arranged in the first direction and first connectors connecting the first touch cells to each other, and
wherein the second touch electrode includes second touch cells arranged in the second direction and second connectors connecting the second touch cells to each other.

15. The display device of claim 14, further comprising
an inorganic layer disposed on the encapsulation layer; and
a planarization layer disposed on the inorganic layer,
wherein the first connectors are disposed on the inorganic layer,
wherein the first touch cells, the second touch cells, and the second connectors are disposed on the planarization layer, and
wherein the planarization layer includes an opening, wherein the first connectors and the first touch cells are connected via the opening.

16. The display device of claim 15, wherein
the first touch electrode includes fine electrode lines.

17. The display device of claim 16, wherein
the first touch electrode includes an opening between the fine electrode lines traversing each other.

18. The display device of claim 17, wherein
the fine electrode lines overlap the partition wall.

19. The display device of claim 18, further comprising
a conductive layer disposed on the encapsulation layer in the non-display area and connecting the touch wire and the first touch electrode to each other.

20. The display device of claim 19, further comprising
a flexible printed circuit substrate electrically connected to the first and second touch pad portions.

* * * * *